US011219313B2

(12) United States Patent
 Cattaneo

(10) Patent No.: US 11,219,313 B2
(45) Date of Patent: Jan. 11, 2022

(54) UNIFIED JOINING AND LEVELLING SYSTEM FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 0 days.

(21) Appl. No.: 16/643,475

(22) PCT Filed: Sep. 6, 2018

(86) PCT No.: PCT/IB2018/056791
§ 371 (c)(1),
(2) Date: Feb. 28, 2020

(87) PCT Pub. No.: WO2019/053564
PCT Pub. Date: Mar. 21, 2019

(65) Prior Publication Data
US 2020/0359792 A1    Nov. 19, 2020

(30) Foreign Application Priority Data

Sep. 13, 2017   (IT) .......................... 102017000102366

(51) Int. Cl.
*A47B 91/04*        (2006.01)
*A47B 91/02*        (2006.01)
(Continued)

(52) U.S. Cl.
CPC ............ *A47B 91/024* (2013.01); *F16B 12/14* (2013.01); *F16H 25/20* (2013.01);
(Continued)

(58) Field of Classification Search
CPC . A47B 2230/07; A47B 91/028; A47B 91/026; A47B 91/02; A47B 91/00;
(Continued)

(56) References Cited

U.S. PATENT DOCUMENTS 5,292,095 A * 3/1994 Cattaneo ............... A47B 91/028
                                              248/188.4
5,741,083 A * 4/1998 Schvartz ............... E04B 1/2604
                                              403/297
(Continued)

FOREIGN PATENT DOCUMENTS

EP       2653068 A1   10/2013
JP    2002085176 A    3/2002
(Continued)

*Primary Examiner* — Christopher Garft
(74) *Attorney, Agent, or Firm* — Themis Law

(57) ABSTRACT

A joining and levelling system adapted for use in furniture and furnishing items having a bottom and a shoulder positionable with respect to a floor includes, in combination, a front foot unit and a rear foot unit, each having a connection group and a blocking group of a joining device for stably interconnecting the bottom and the shoulder. The connection group and the blocking group can be actuated from the front with respect to the furniture, the front and rear foot units being positioned beneath the bottom and facing the shoulder, and the bottom and the shoulder not resting on the floor. The front and rear foot units are disposed in an identical body for both the front and the rear foot units, and actuation rods of the joining device are arranged in the rear foot unit and positioned between the front and the rear foot units.

11 Claims, 17 Drawing Sheets

(51) Int. Cl.
    *F16B 12/14*          (2006.01)
    *F16H 25/20*          (2006.01)
(52) U.S. Cl.
    CPC .................. *F16B 2012/145* (2013.01); *F16H 2025/2046* (2013.01); *F16H 2025/2062* (2013.01)
(58) Field of Classification Search
    CPC ...... A47B 91/024; F16B 5/0024; F16B 12/18; F16B 12/24; F16B 12/10; F16B 2012/2081; F16B 12/2063; F16B 12/2054; F16B 12/20; F16B 2012/145; F16B 12/14; F16M 11/24; F16H 2052/2062; F16H 2025/2046; F16H 25/20
    USPC ...................................................... 248/188.4
    See application file for complete search history.

(56)            References Cited

U.S. PATENT DOCUMENTS

2011/0008127  A1*  1/2011  Ajanovic ............ F16B 12/2063
                                                      411/118
2016/0032955  A1*  2/2016  Chang ..................... F16B 12/20
                                                      312/330.1
2016/0223001  A1*  8/2016  Broughton .............. F16B 12/24

FOREIGN PATENT DOCUMENTS

WO         9203663  A1    3/1992
WO      2005115199  A1   12/2005

* cited by examiner

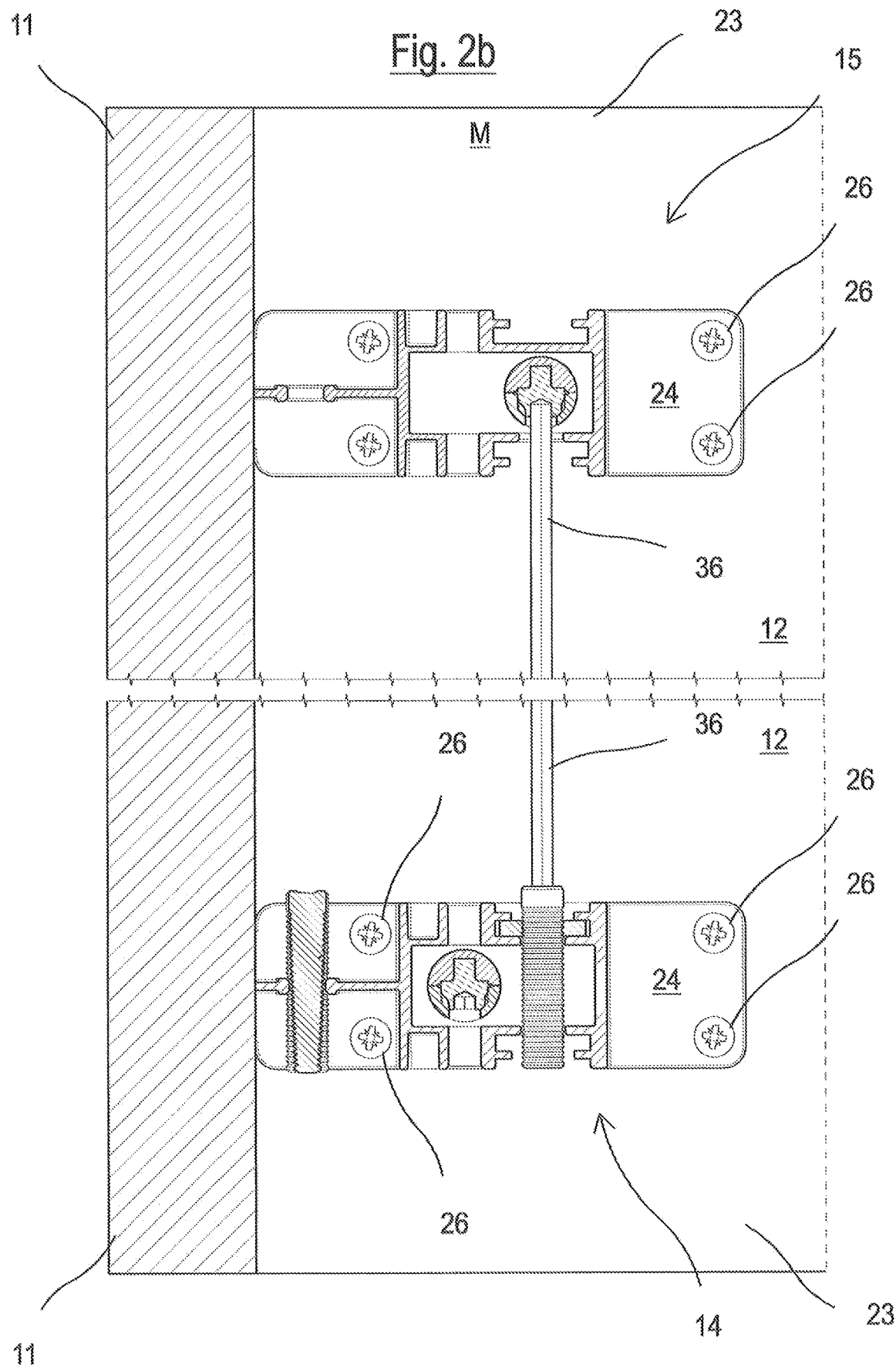

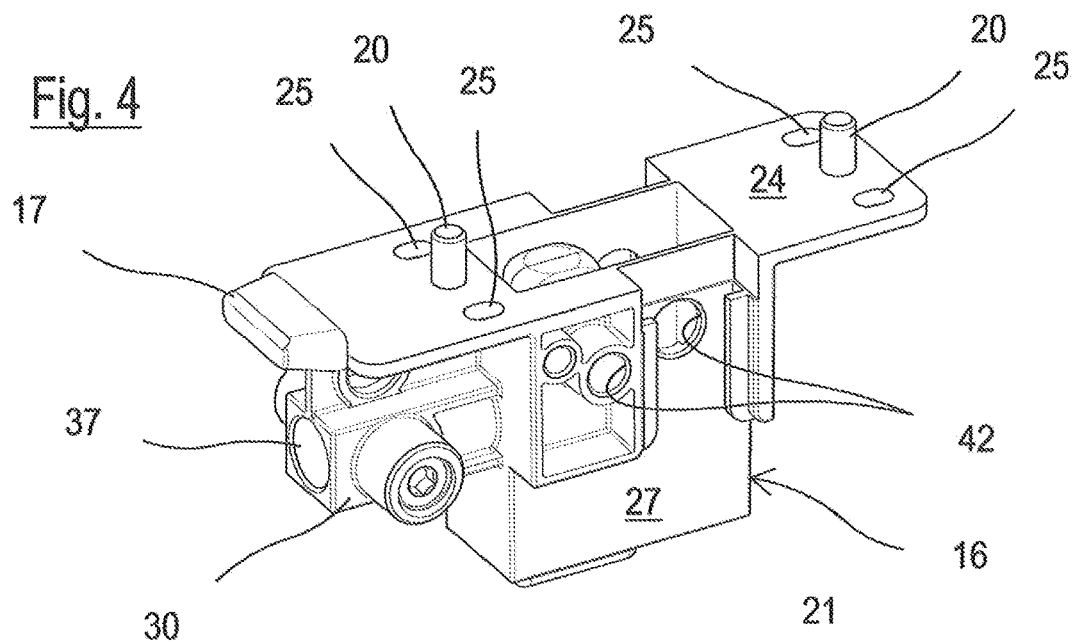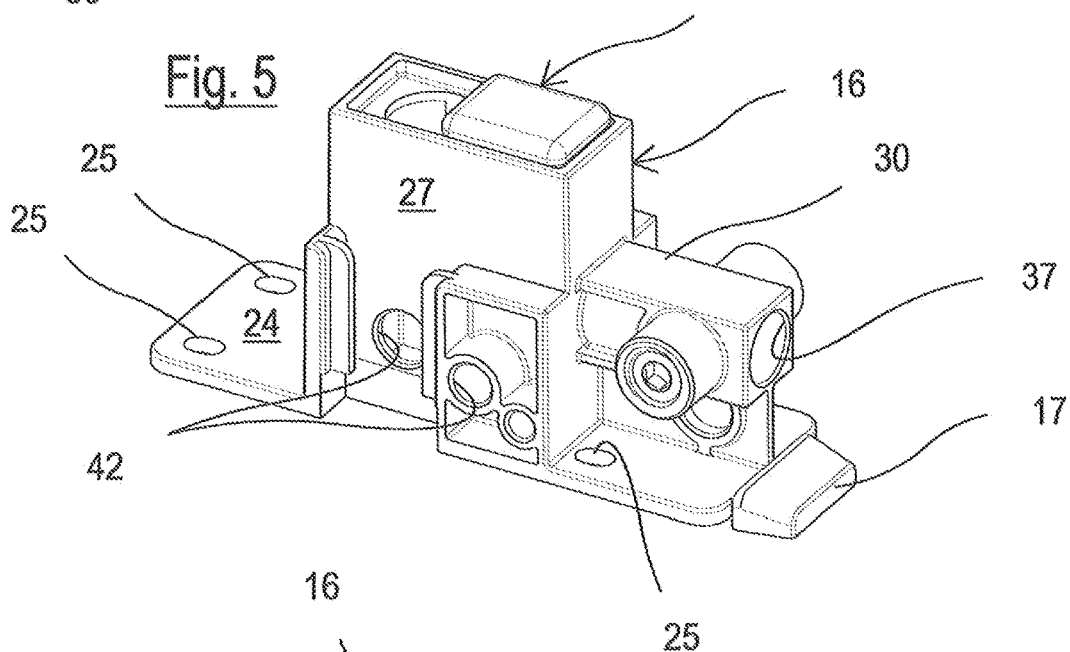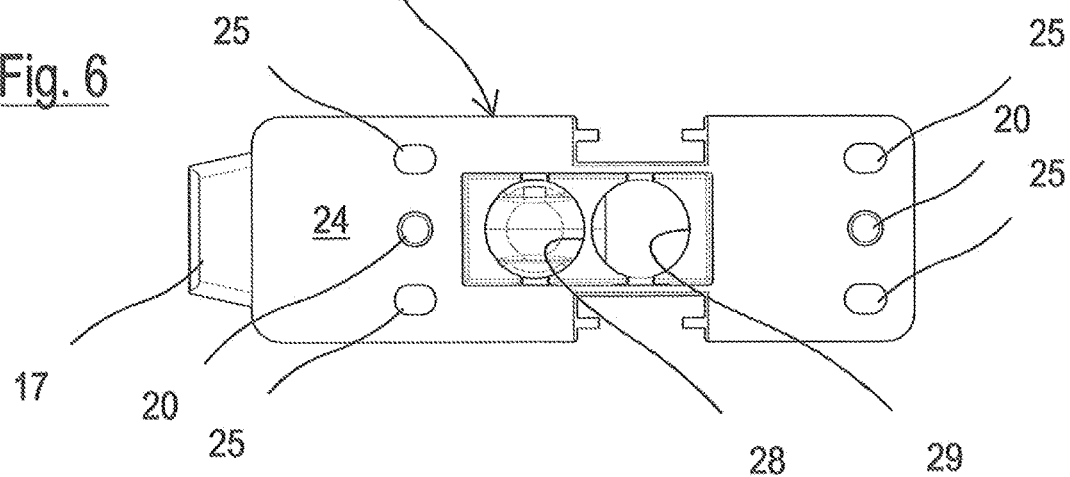

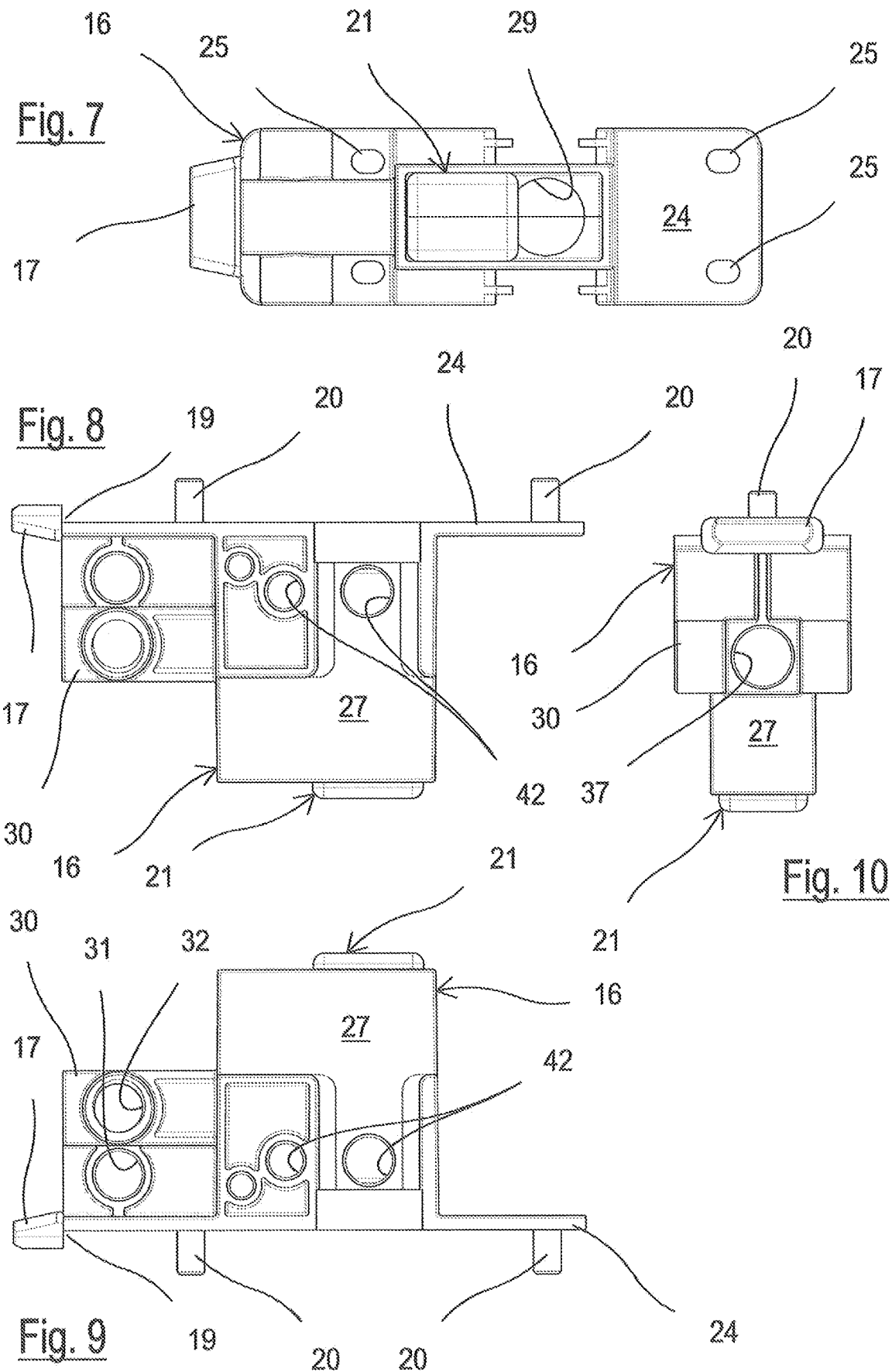

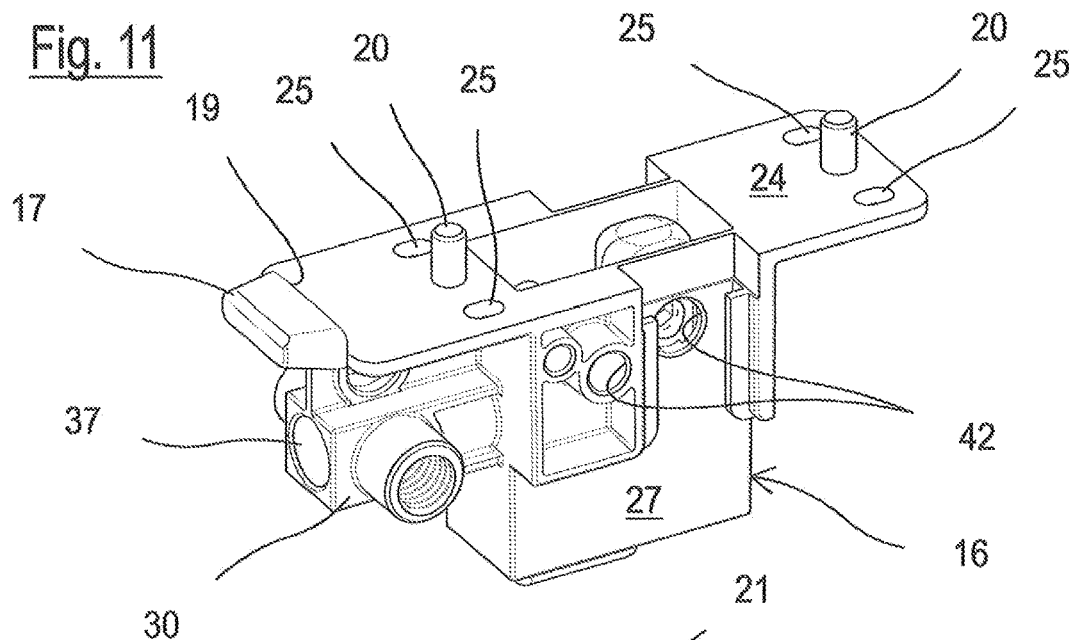
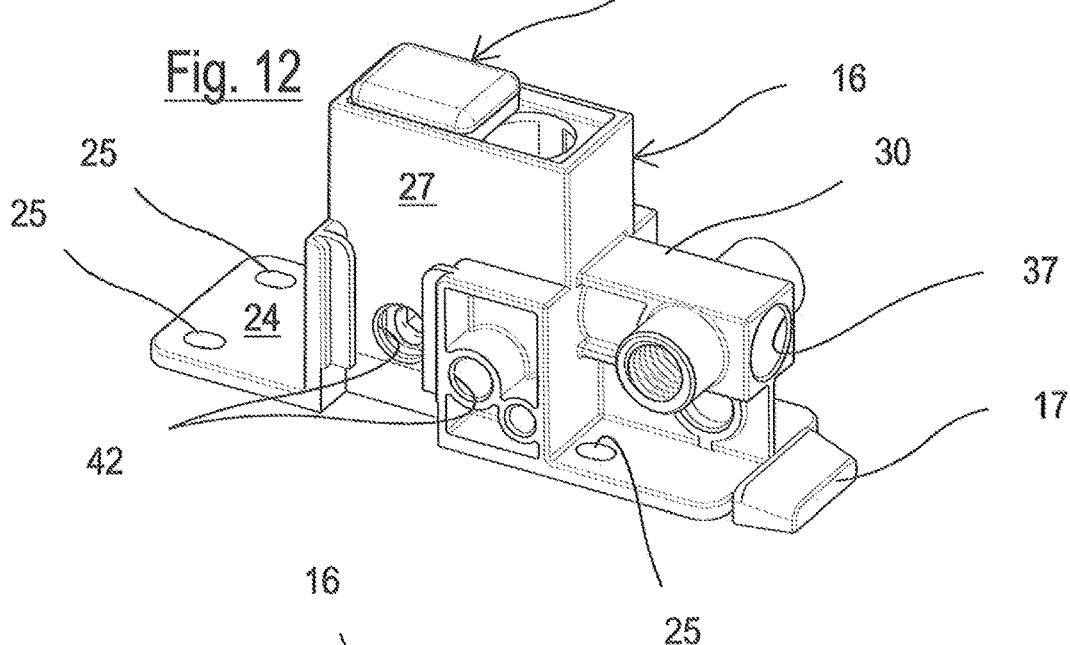
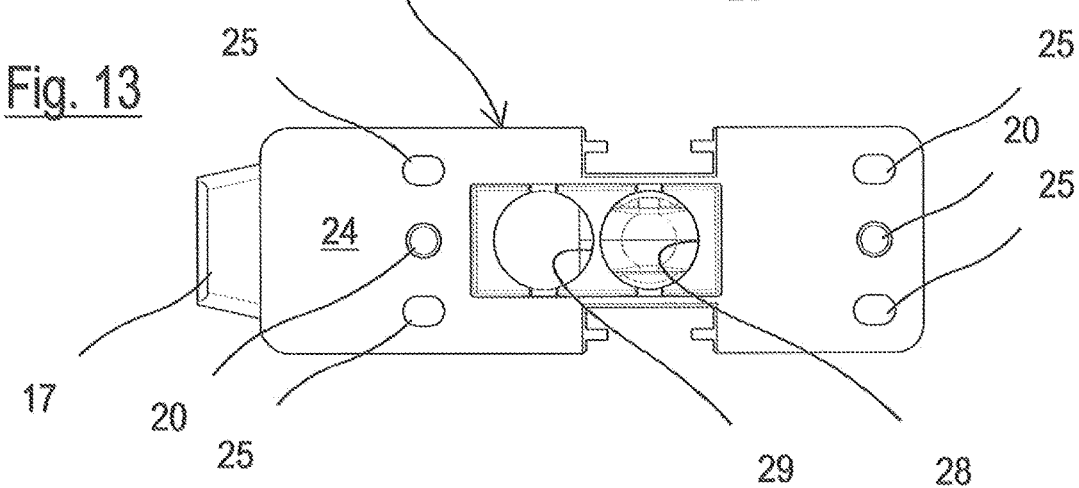

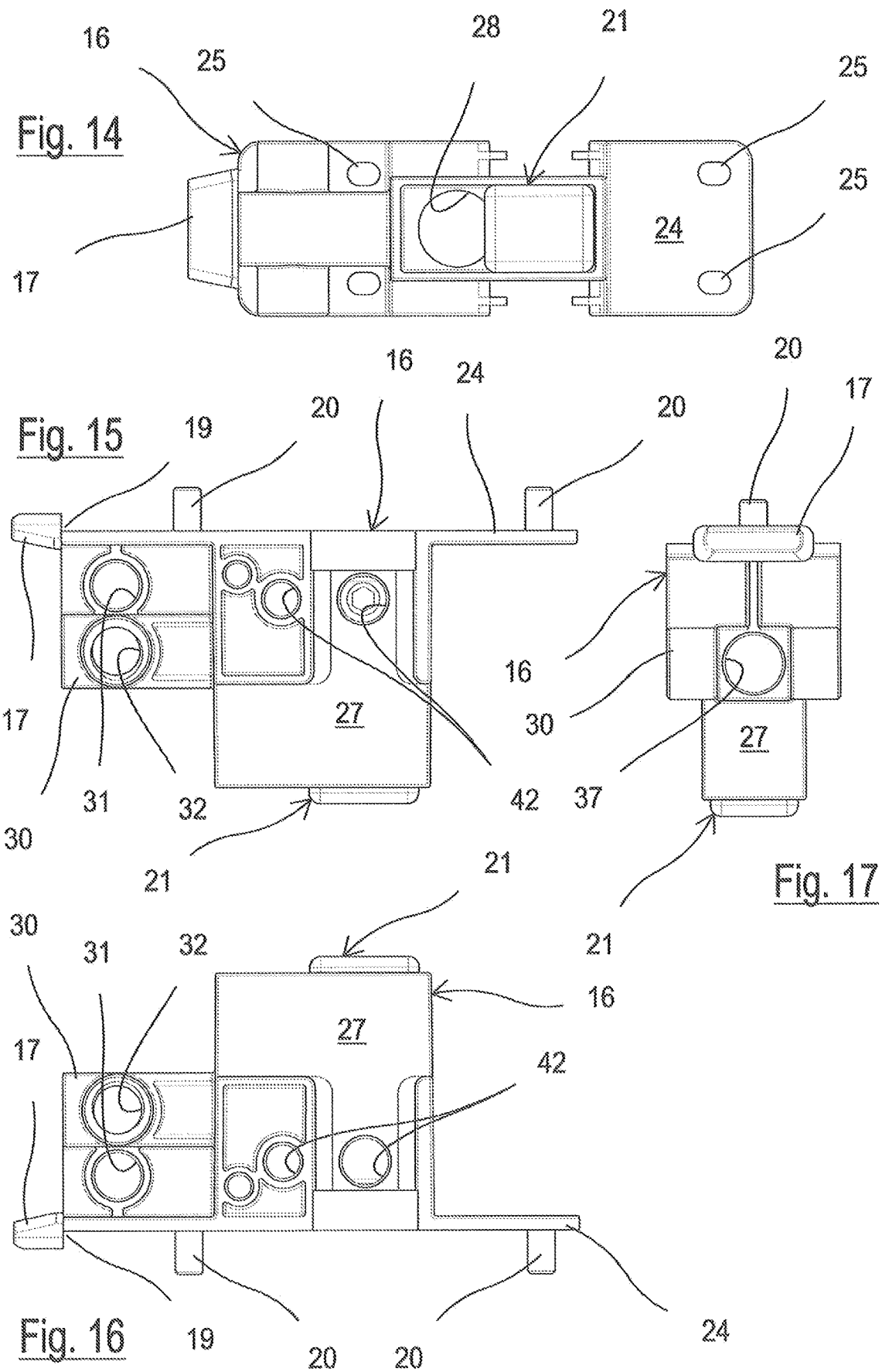

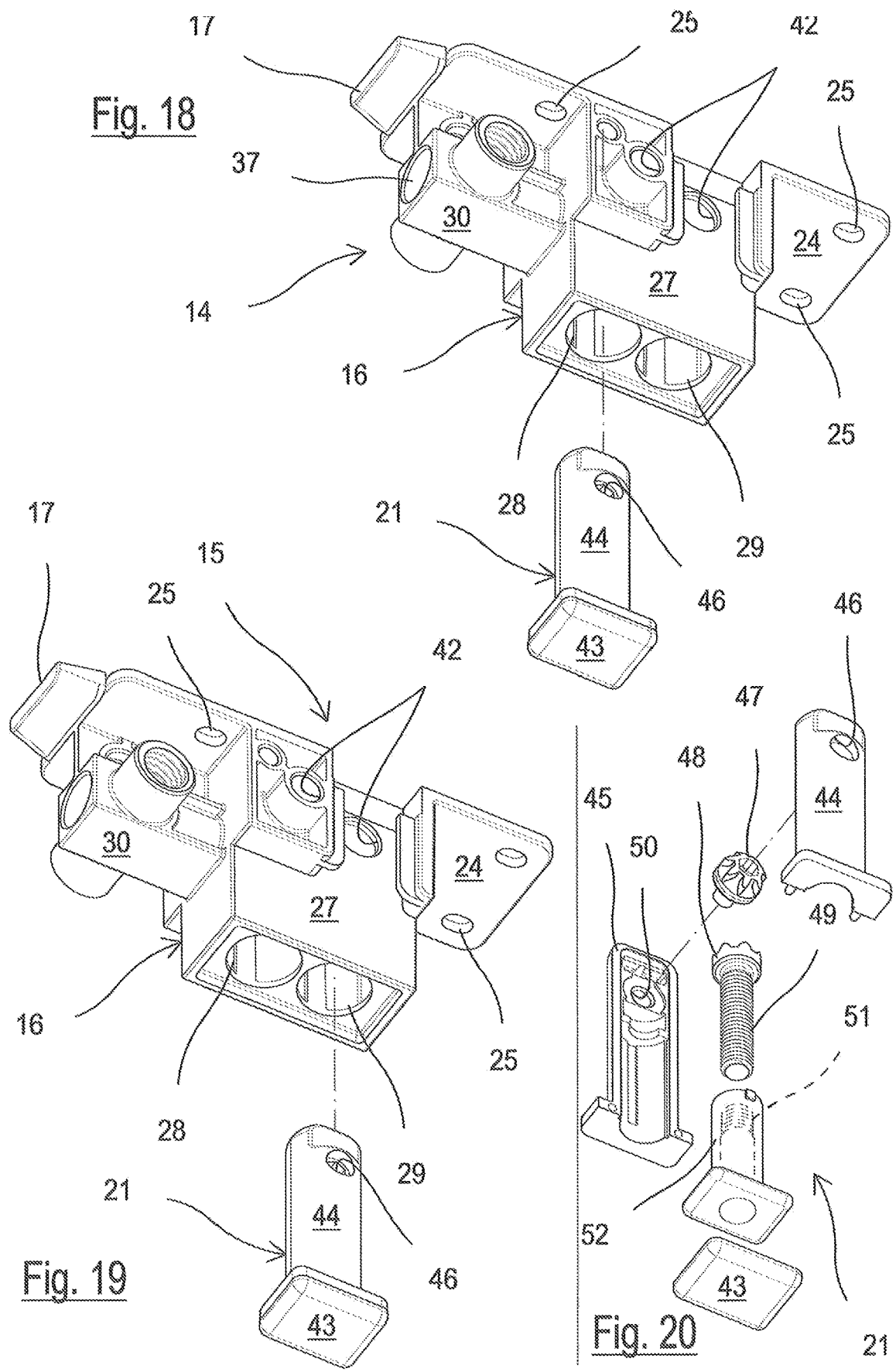

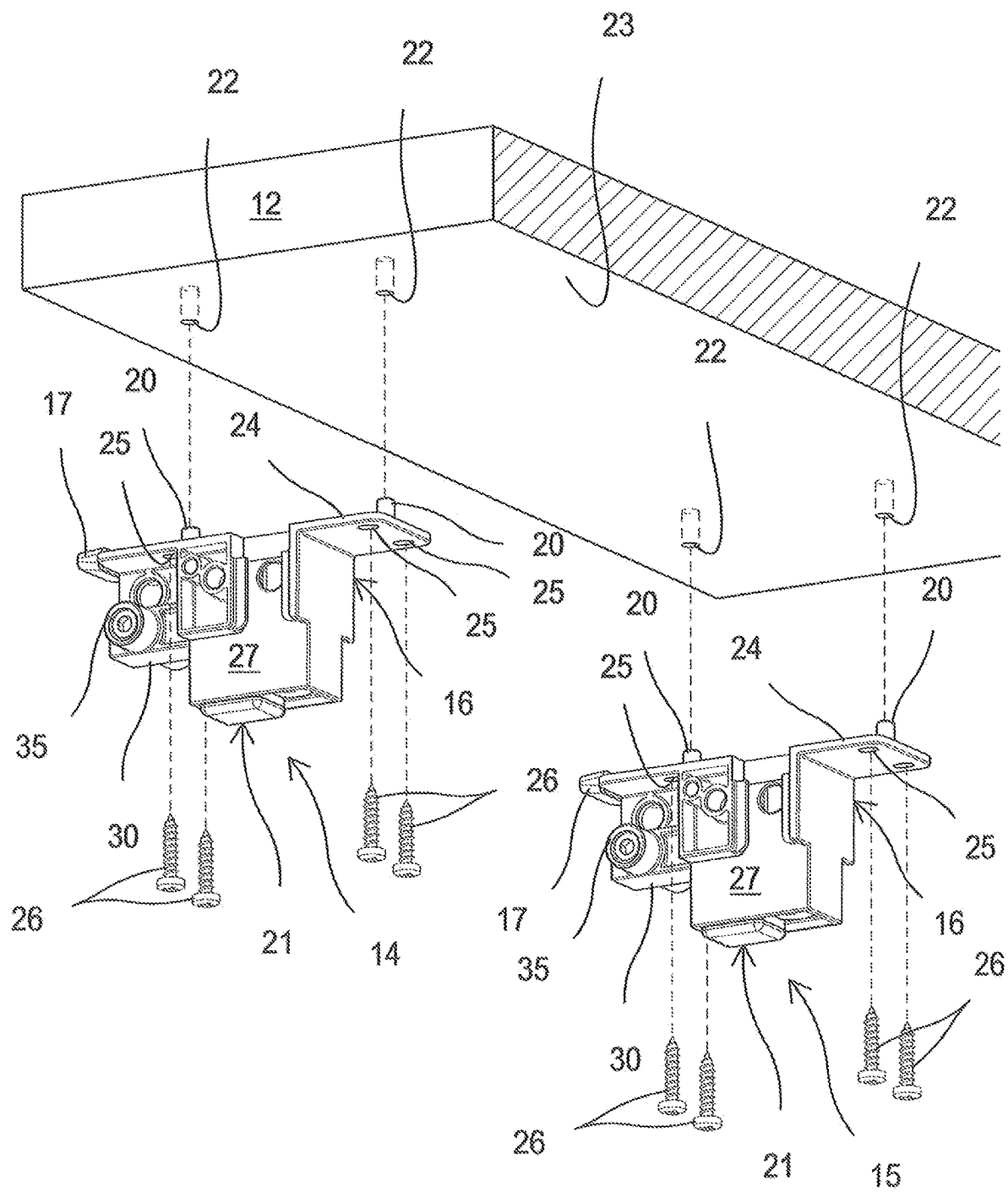

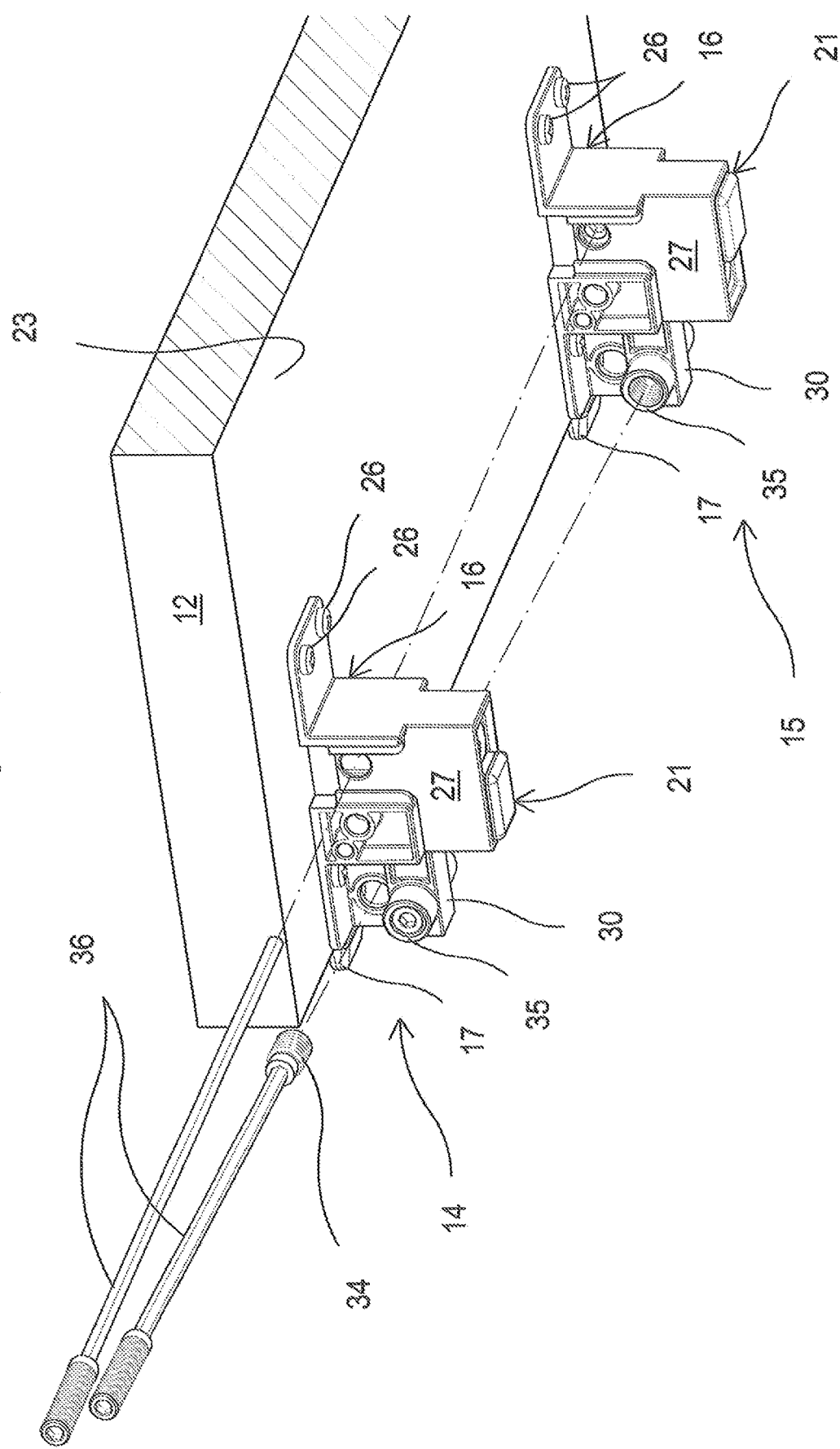

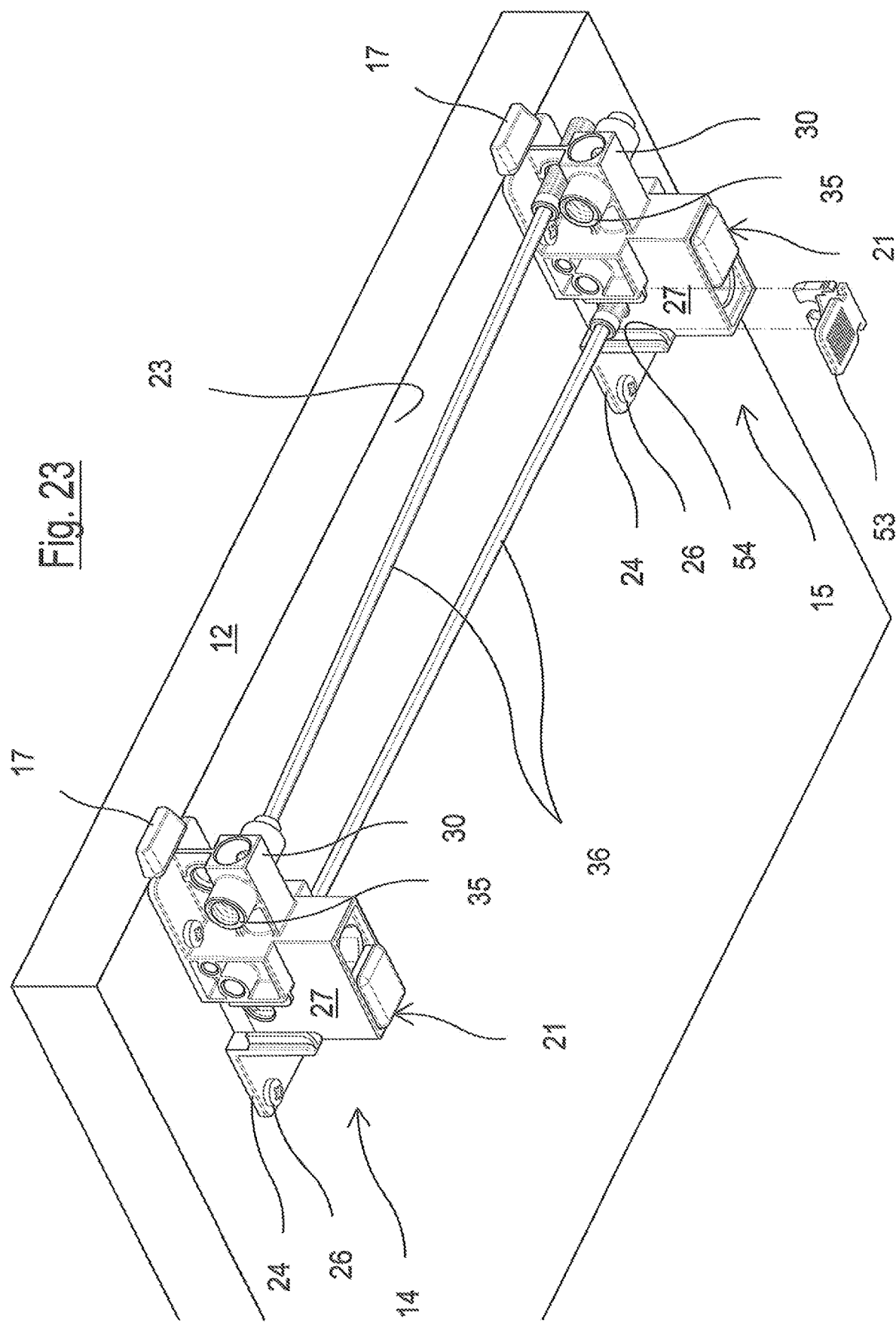

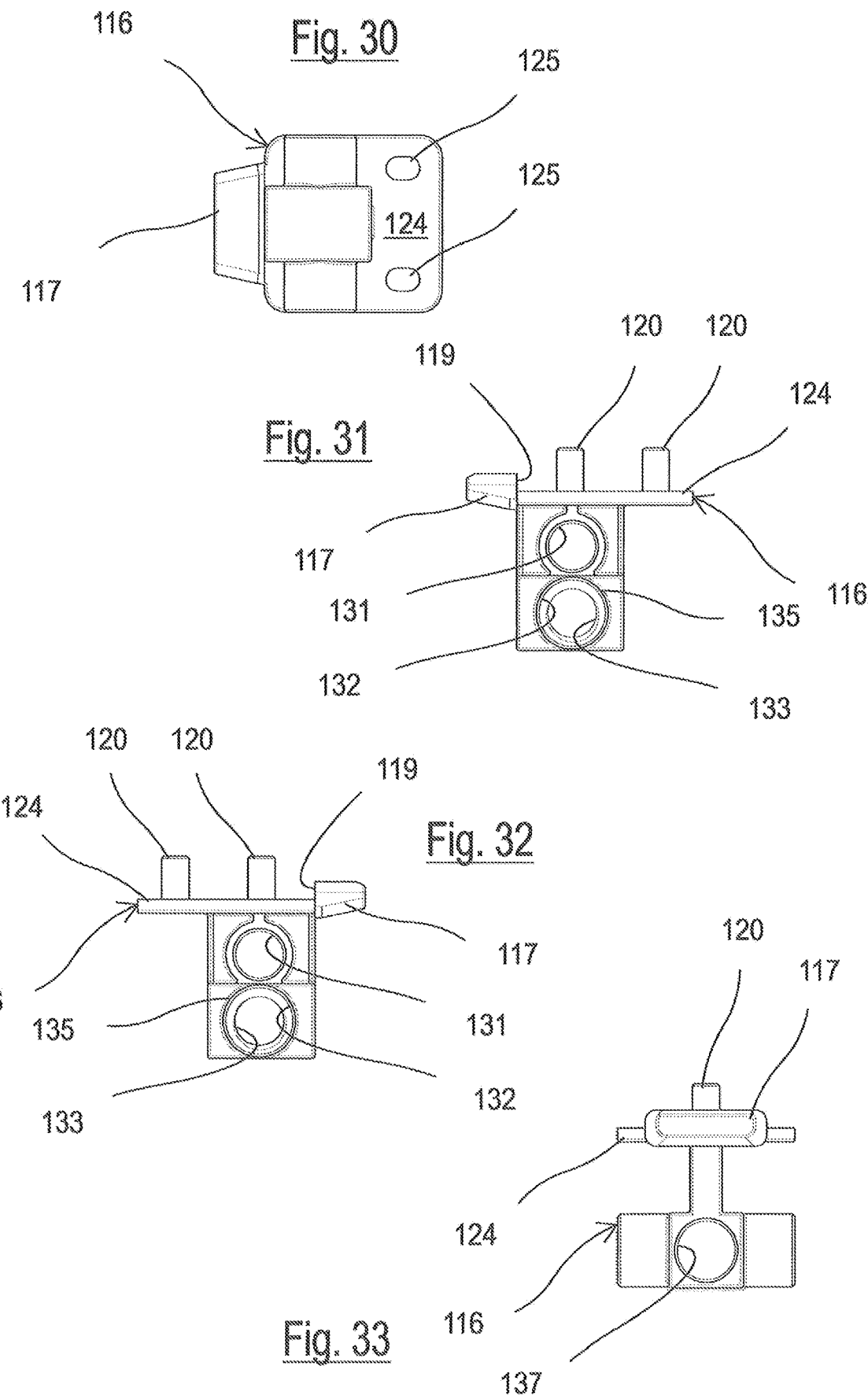

UNIFIED JOINING AND LEVELLING SYSTEM FOR PARTS OF FURNITURE AND FURNISHING ITEMS

The present invention relates to a unified joining and levelling system for parts of furniture and furnishing items.

Various joining and levelling systems for parts of furniture and furnishing items are known, which involve the formation of a series of visible holes unwelcome to designers and fitters for the positioning of feet or bodies bearing joints and/or levellers, both front and rear.

Some of these known systems, moreover, must have spaces destined for actuating the joints and in particular avail of a certain free space beneath the furniture: this is mainly for adjusting the rear feet or bodies of the furniture and rear joints. The size of these measurements can be as little as 18 mm.

This measurement of the space beneath the bottom of the furniture to the floor allows the use of joining pins between the shoulder and bottom having the same length for both the front and rear foot units.

All of these solutions for joining and/or levelling systems for parts of furniture and furnishing items propose a front actuation that relates to both the device for joining a bottom to a shoulder and also the levelling device of the furniture.

In all of these cases there is an arrangement of the furniture wherein the shoulder(s) rest on the floor and the bottom or lower shelf is raised with respect to the underlying floor.

Furthermore, in all of these cases, there are front supporting feet and rear supporting feet that must be destined for the right or left side with respect to the shoulder(s) for positioning and use. This must therefore be taken into account and both right and left feet must be available in the assembly phase.

WO 92/03663 relates to a fixing device comprising a leg for a piece of furniture that can be positioned beneath a horizontal panel and a shoulder.

WO 2005/115199 discloses a levelling system for a piece of furniture.

The general objective of the present invention is to provide a joining and levelling system for parts of furniture and furnishing items that solves the problems and drawbacks indicated above.

A further objective of the present invention is to provide a joining and levelling system for parts of furniture and furnishing items that is particularly simplified, compact and able to use as few constituent elements as possible for the fitter. This need for the fewest possible component parts must apply to both pins and foot units or similar bodies.

Another objective of the present invention is to provide a joining and levelling system for parts of furniture and furnishing items that allows a front connection and adjustment, also for rear joints and levelling feet.

The above objectives are achieved by a system having the characteristics specified in the enclosed claim 1 and subclaims.

The structural and functional characteristics of the invention and the advantages with respect to the known art can be clearly understood from the following description, referring to the attached drawings, which illustrate various embodiments of the invention itself.

In the drawings:

FIG. 1 is a perspective view illustrating a first example of a joining and levelling system for parts of furniture and furnishing items produced according to the present invention designed for joining a shoulder and a base or bottom of a piece of furniture with a front foot unit and a rear foot unit positioned under the bottom and adjacent to the shoulder of the furniture, wherein the bottom and shoulder are not flush with each other as the shoulder is near the floor;

FIG. 2b is a partially sectional view from below of the joining and levelling system shown in FIG. 1, in correspondence with holes of the blocking group;

FIGS. 4 and 5 are perspective views according to different directions of a body of a foot unit provided with the joining device and leveller inserted therein to act as a front foot unit;

FIGS. 6 and 7 are plan views from above and below of the front foot unit of FIGS. 4 and 5;

FIGS. 8, 9 and 10 are raised views from the two long sides and from a short side of the front foot unit of FIGS. 4 and 5;

FIGS. 11 and 12 are perspective views according to different directions of a body of a foot unit provided with the joining device and leveller inserted therein to act as a rear foot unit;

FIGS. 13 and 14 are plan views from above and below of the front foot unit of FIGS. 11 and 12;

FIGS. 15, 16 and 17 are raised views from the two long sides and from a short side of the foot unit of FIGS. 11 and 12;

FIG. 18 is a perspective view of the front foot unit with a levelling device exploded from the foot unit;

FIG. 19 is a perspective view of the rear foot unit with a levelling device exploded from the foot unit;

FIG. 20 is a perspective view with partially exploded parts of the levelling device alone as shown in FIGS. 18 and 19;

FIGS. 21 to 24 are perspective views showing successive insertion steps of the front and rear foot units in the bottom, transmission rods in the front and rear foot units, the blocking in position of said transmission rods and the assembly of the shoulder with respect to the bottom provided with front and back foot units;

Figure 25:
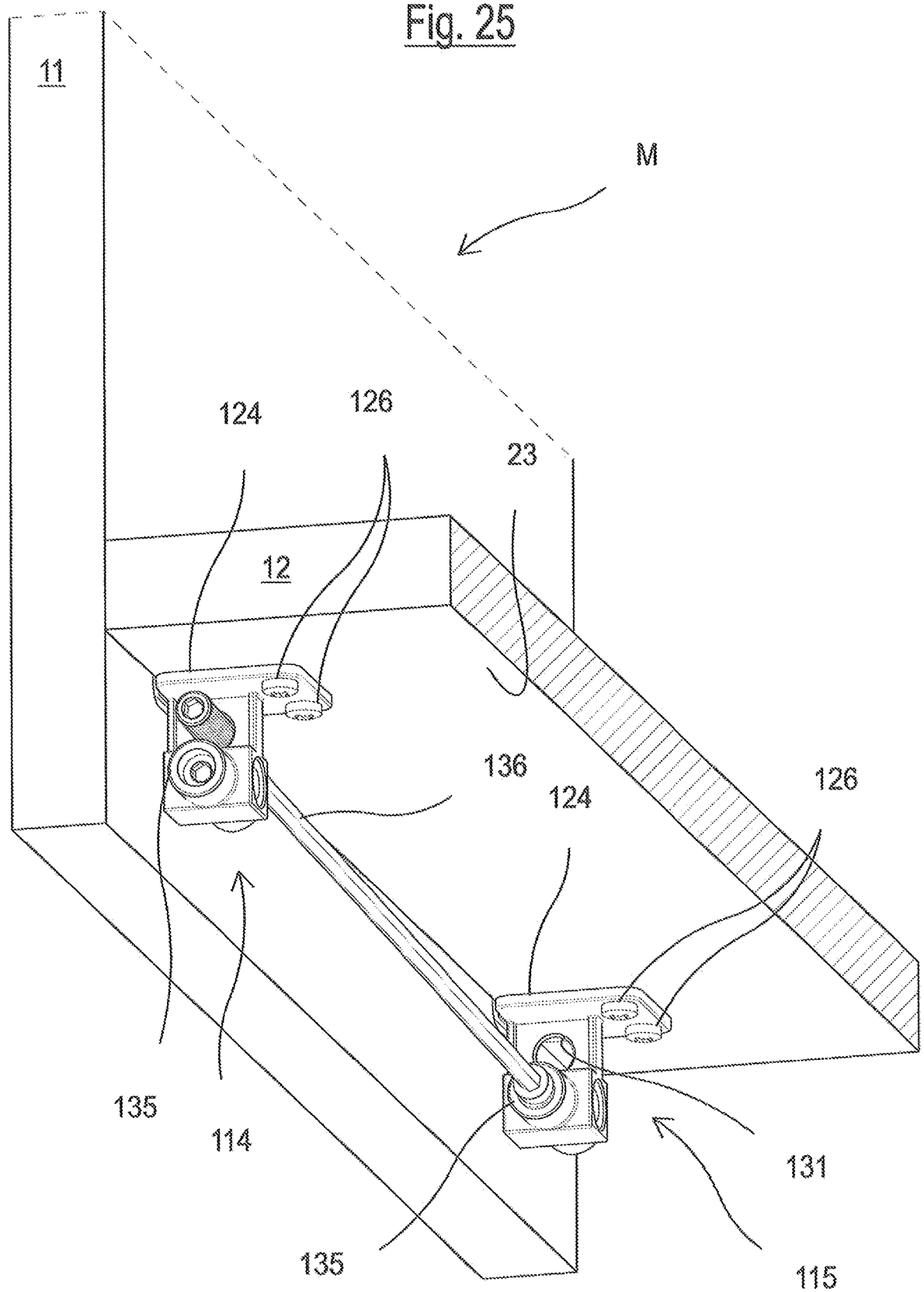
Figure 26:
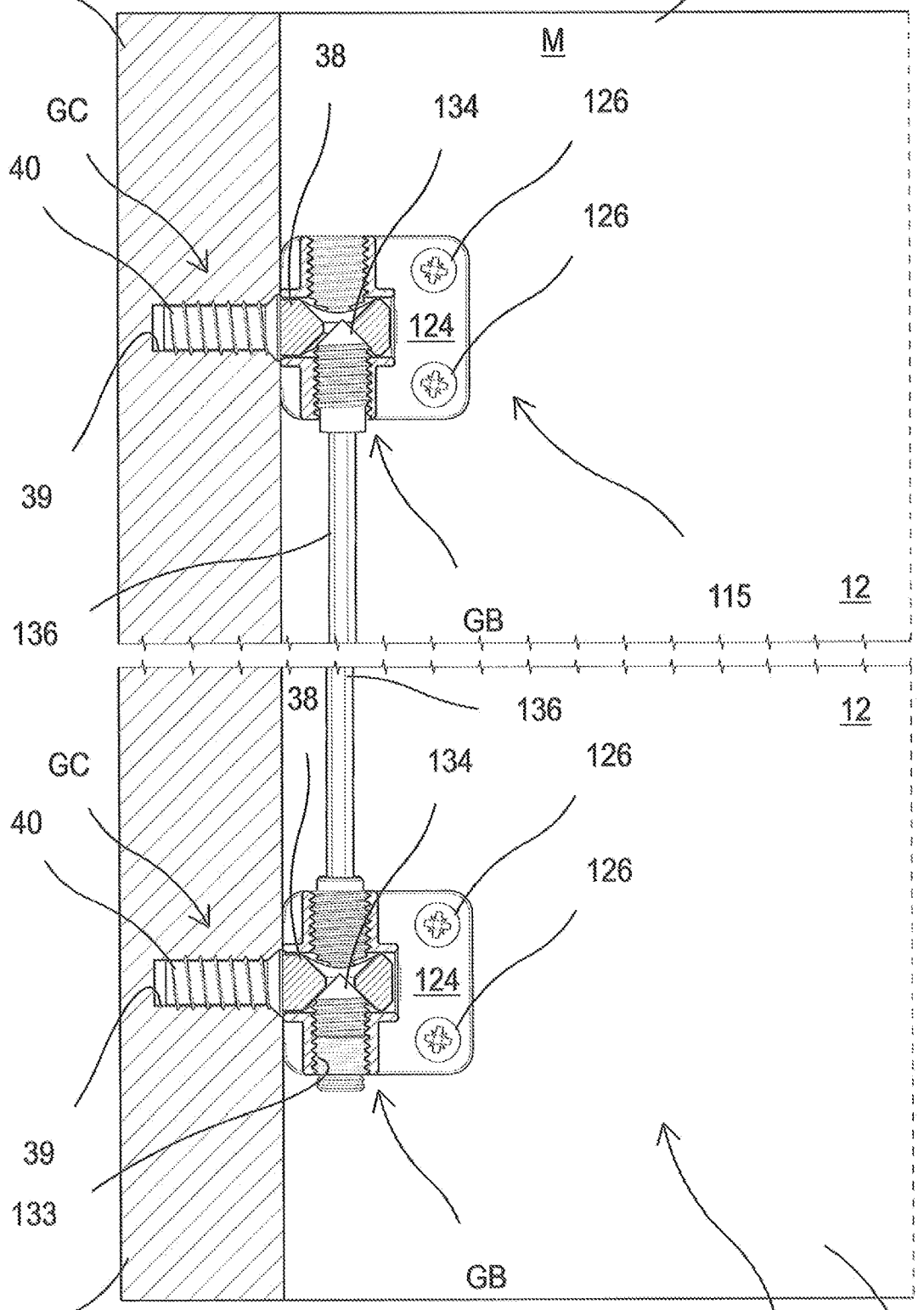
Figure 27:
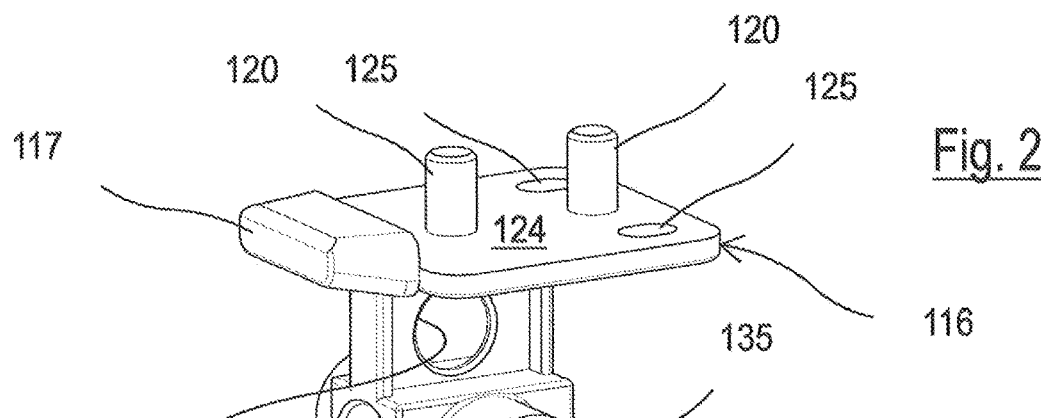
Figure 28:
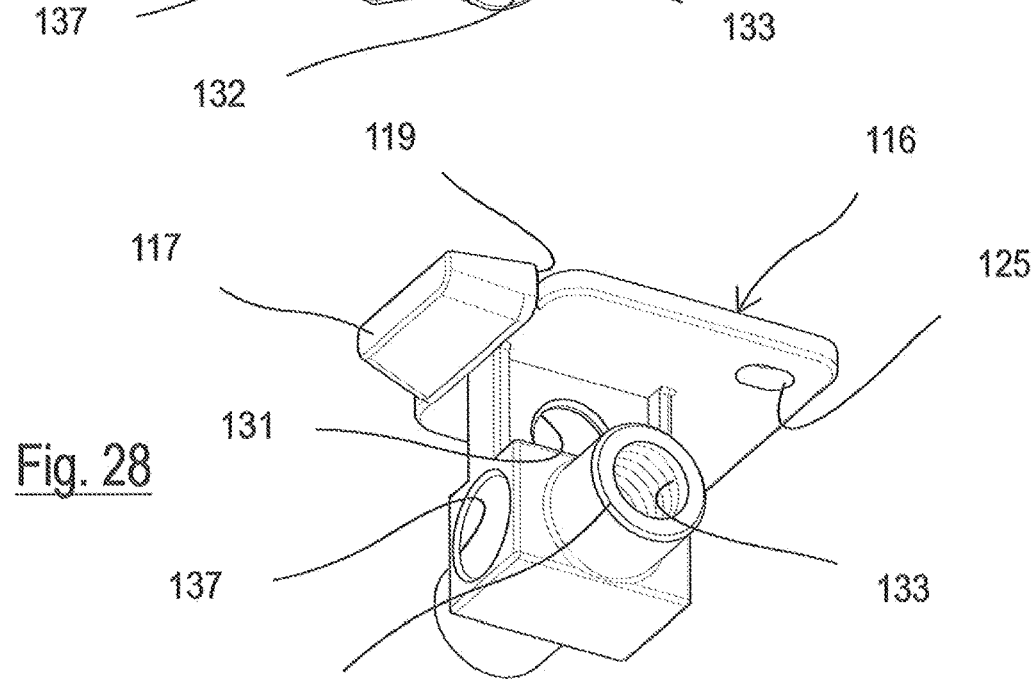
Figure 29:
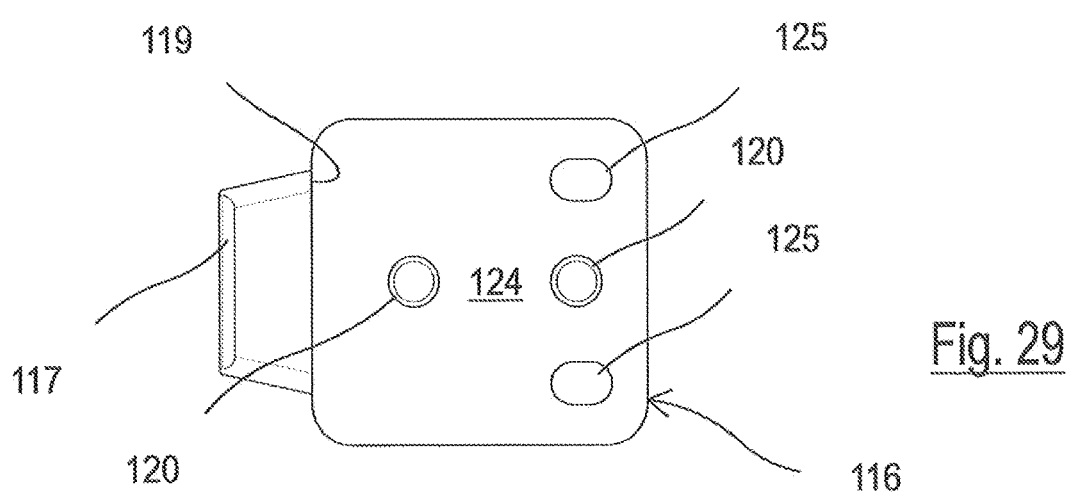

FIG. 25 is a perspective view illustrating a second example of a simplified joining system for parts of furniture and furnishing items produced according to the present invention designed for joining a shoulder and a base or bottom of a piece of furniture with a front foot unit and a rear foot unit positioned beneath the bottom and adjacent to the shoulder of the furniture, wherein the bottom and shoulder are not flush with each other as the shoulder is near the floor;

FIG. 26 is a partially sectional view from below of the joining and/or levelling system shown in FIG. 1, in correspondence with connection pins;

FIGS. 27 and 28 are perspective views according to different directions of a body of a front or rear foot unit of the joining device inserted;

FIGS. 29 and 30 are plan views from above and below of the front or rear foot unit of FIGS. 27 and 28;

FIGS. 31, 32 and 33 are raised views from the two long sides and from a short side of the front or rear foot unit of FIGS. 27 and 28.

With reference to the drawings, it can be noted in general that some of the figures partially illustrate a piece of furniture M provided with shoulders 11 (in the examples side walls) (only one of which is shown) and a bottom 12.

Figure 3:
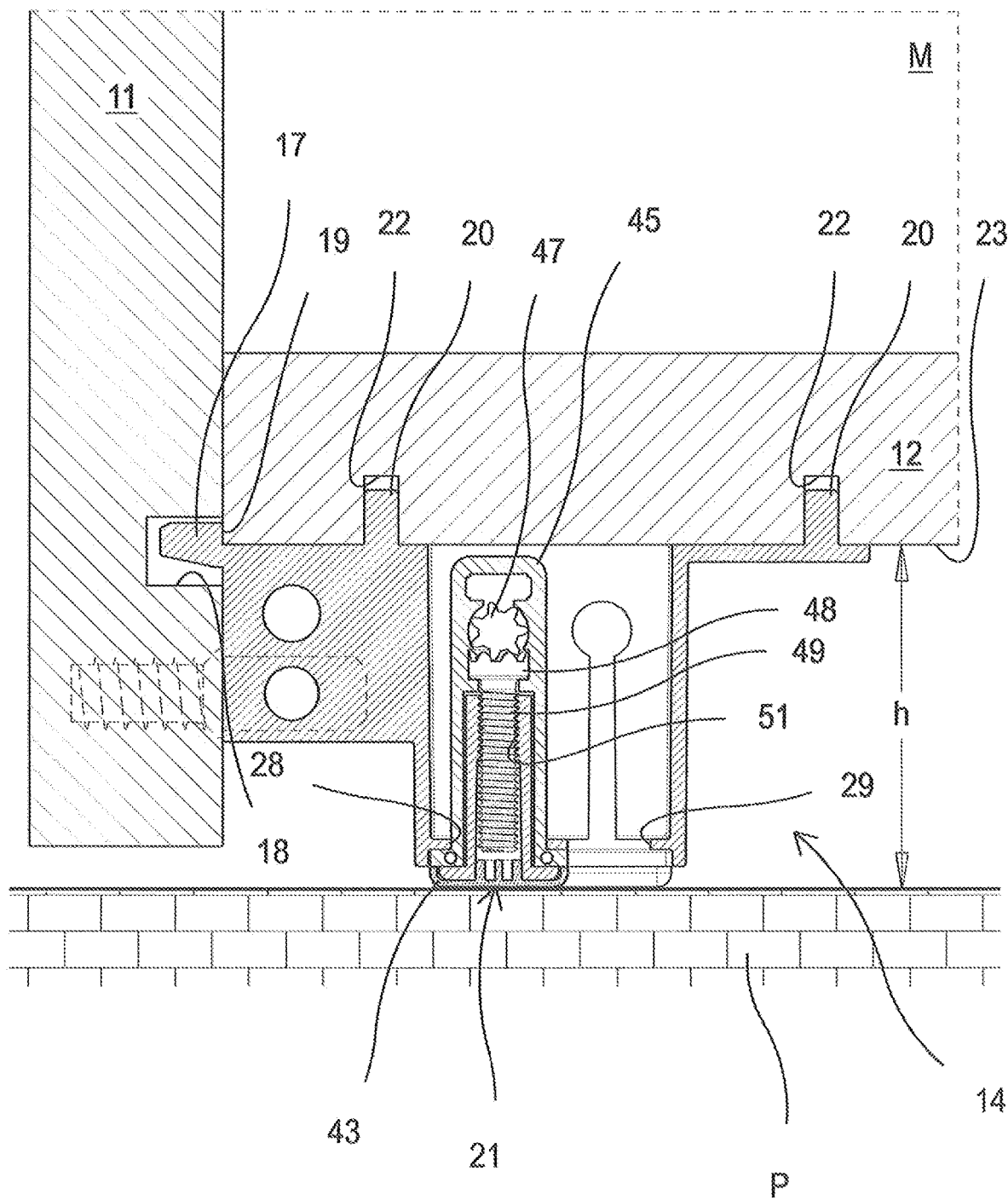
FIG. 3 is a raised sectional view of the front foot unit with a joining and levelling device in addition to the bottom and shoulder of the furniture.

A front foot unit 14 and a rear foot unit 15 positioned beneath the bottom and adjacent to the shoulder 11 of the furniture M are also shown, wherein the bottom 12 and the shoulder 11 are not flush with each other as the shoulder 11 is near a floor P (FIG. 3).

As can be observed, in furniture of this type, a space h is defined underlying the bottom 12 and the shoulder 11 that is truly minimal, which, in this case, is however greater than 18 mm.

The front foot units 14 and a rear foot unit 15 of the furniture M must in this case sustain its weight (shoulders, bottom and shelves) in addition to that of the additional contents in the presence of no other support.

The height h of the space between the bottom 12 and the floor P, makes it difficult for the operator to have access above all to the rear foot units.

In this way, it is extremely difficult to effect the joining and above all each adjustment in situ due to this relatively small distance between the floor P and the bottom 12 of the furniture M.

FIGS. 1 to 24 show how, in a first example of the system of the invention, at least one front foot unit 14 and one rear foot unit 15 are fixed to the bottom or base 12 to provide a joining and levelling system.

Both of the foot units 14 and 15 incorporate joining devices between the parts of the furniture or furnishing item and levelling devices with respect to the floor P.

From the figures, it can also be noted that both the front foot unit 14 and the rear foot unit 15 of the joining and levelling system comprise a body 16 which, according to the invention, is a valid body (usable) for both, and also valid for applications on both shoulders on the right and shoulders on the left.

The body 16, in fact, comprises housings for both a levelling device 21 and for elements of a connection group GC and a blocking group GB providing a joining device. The body 16 thus produced is used for the composition of both the front foot unit 14 and the rear foot unit 15.

Figure 24:
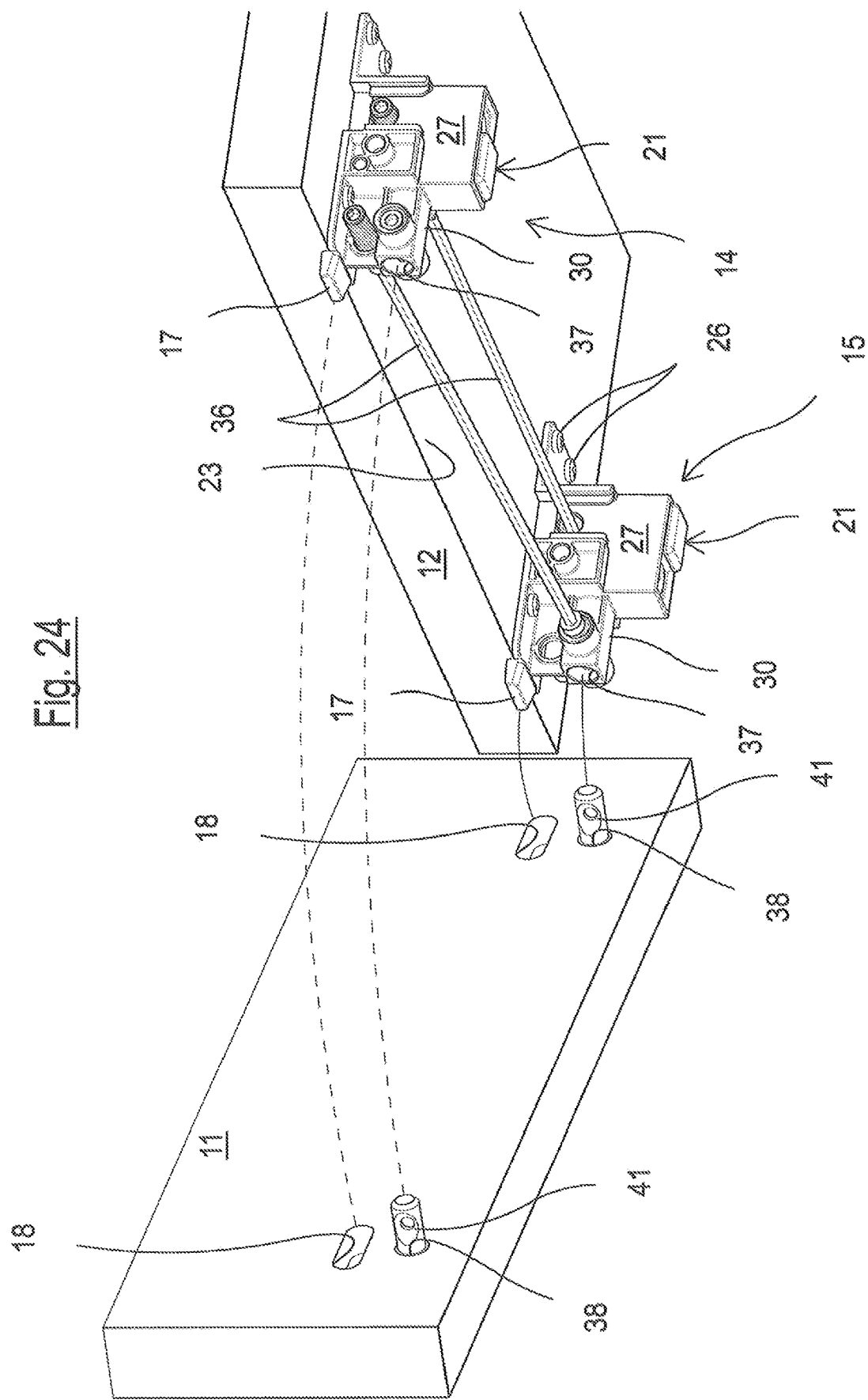

The body 16, for example moulded in zamak or in another material suitable for the purpose, provides voids and ribs for lightening and/or stiffening. It also has a protruding appendix or nose 17 in one of its parts facing the right or left shoulder 11. This protruding appendix or nose 17 is suitable for being inserted in a complementary slot-shaped recess 18 formed in the shoulder 11 (FIG. 24). This protruding appendix or nose 17 also has an undercut 19 which is abutted against the short side of the bottom 12 facing the shoulder 11.

A pair of pegs 20 projecting from the body 16 also cooperate in obtaining this precise positioning between the parts. Said pegs 20 are inserted in blind holes 22 formed on a lower surface 23 facing downwards towards the bottom 12. Finally, it can be noted that the body 16 has an enlarged base 24, provided in the example with four holes 25, which is arranged on the lower surface 23 of the bottom 12. Screws 26 are positioned in said holes 25 of the enlarged base 24 of the body 16, firmly constraining it beneath the bottom 12.

Thus, in this way, the body 16 i.e. the consequent front foot unit 14 and rear foot unit 15, is correctly arranged between shoulders 11 and bottom 12 at the required height from the underlying floor P.

It has been said that the body 16 comprises housings for the levelling device 21. A portion with a larger dimension 27 of the body 16, in fact, provides a pair of adjacent housings 28, 29 which receive an outer casing of the levelling device 21.

The figures also very clearly show that the body 16 provides, in a portion having a smaller size 30, flanked by the larger portion 27, pass-through holes 31, 32 superimposed in a vertical direction to the floor P and having multiple uses that are described hereunder.

The first pass-through holes 32 are also internally threaded in 33 to receive a grub screw 34 and form the blocking group GB, for both the front foot unit 14 and for the rear foot unit 15. Said holes 31 can have a collar 35 towards the outside which facilitates both the housing of the grub screw 34 and the housing of one end of an actuation rod 36 which controls it in rotation.

The second holes 31 are only pass-through holes to allow the passage of an actuation rod 36.

Furthermore, the portion having a smaller dimension 27 of the body 16, in its short side facing the shoulder 11, provides a blind hole 37 which receives a pin 38 which forms part of the connection group GC.

More specifically, it can be seen how the shoulder 11 provides a seat in the form of a horizontal blind hole 39 in which (39) a threaded end 40 of the pin 38 protruding from the same shoulder 11 is stably positioned.

The pin 38 is housed in the above-mentioned hole 37 of the body 16. The pin 38 in its protruding part, provides a housing 41 for a tip of the blocking grub screw 34 of the blocking group GB of the joining device.

It can also be noted that the actuation rod 36 is tilted as the actuation point of the grub screw 34 of the rear foot unit 15 is not aligned with the actuation point of the actuation rod 36 in the front foot unit 14.

The figures show with equal clarity that the body 16 also provides, in its larger portion 27, in addition to housings 28 and 29 for the levelling device 21, holes 42 for actuating the levelling devices 21.

In this respect, FIGS. 18 to 21 show how the levelling device 21 is inserted and how said levelling device 21 is constituted.

The levelling device 21 provides a cylindrical casing, for example formed by a pair of half-shells 44, 45 blocked together by means of a base cap or lid 43. In the half-shell 44 of the casing, a hole 46 is provided below for actuating the levelling device 21. The hole 46 provides access to movement means of the leveller. A pinion-toothed crown bevel is in fact positioned inside the casing 44, 45. A pinion 47 is rotatingly positioned inside the casing 44, 45, and engages with a toothed crown 48, formed as the head of a threaded screw 49. The toothed crown 48 is rotatable inside a housing 50 of the casing 44, 45, free to rotate but not to translate. The threaded screw 49 is in turn positioned in a threaded hole 51 inside a hollow pusher element 52, in the form of an overturned cup. The hollow pusher element 52 is positioned coaxially with respect to the outside of the casing 44, 45. The rotation of the threaded screw 49 causes the upward and/or downward movement of the hollow pusher element 52 and the adjustment of the leveller.

With these means the positioning and levelling of the furniture M is obtained with respect to the floor P.

A tool (not shown) controls, through its tip, the pinion 47 passing through both one of the holes 42 of the body 16 and also through the hole 46 of the half-shell 44 of the casing.

FIGS. 18 and 19 show very clearly how the selective insertion of the levelling device 21 in the housing 28 rather than in the housing 29 creates, with the body 16, the right or left front foot unit 14 or rear foot unit 15.

Figure 1:
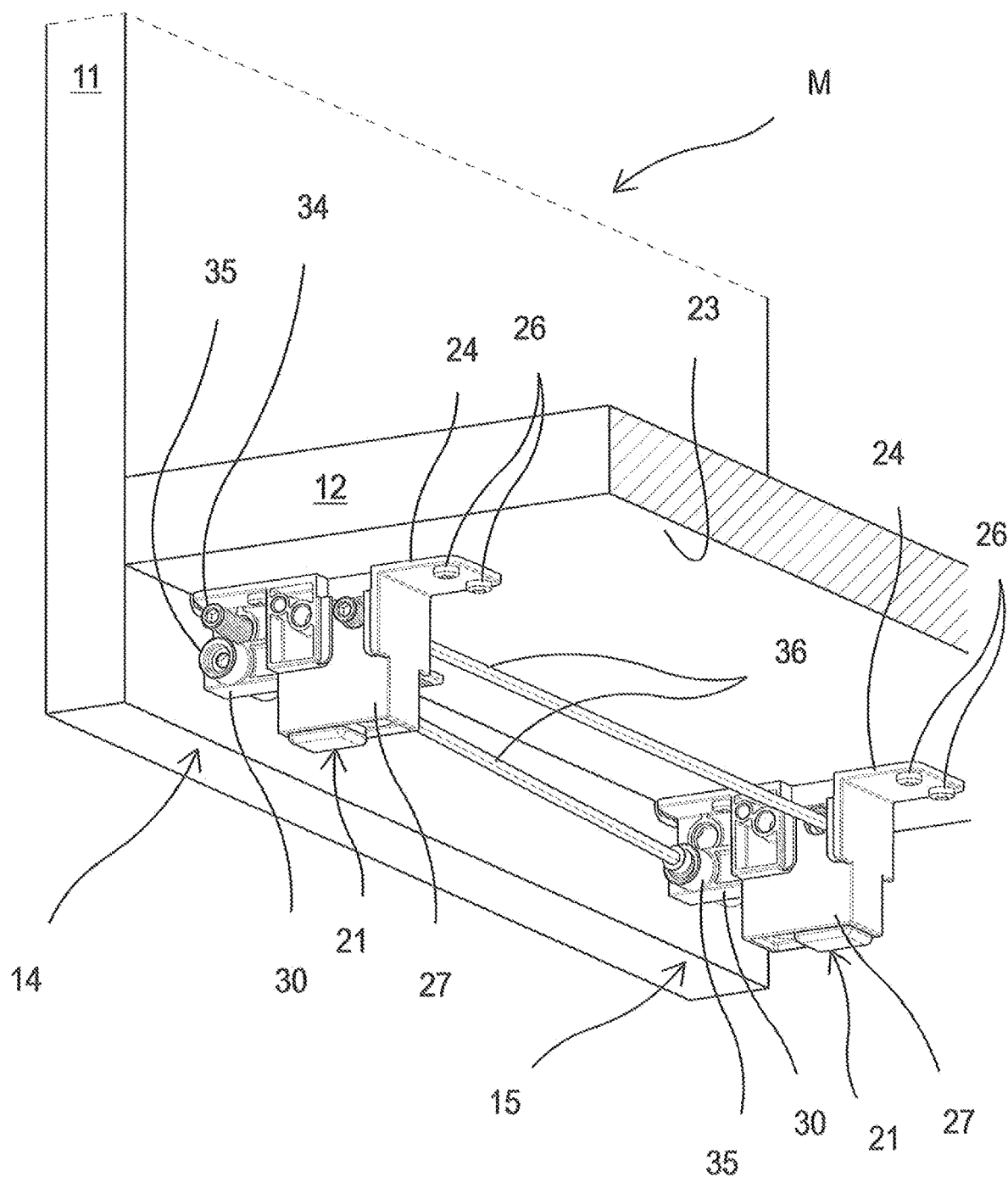

FIG. 1 and FIGS. 23 and 24 show how, in the case of the levelling device 21, there is also the presence of an actuation rod 36 between the front foot unit 14 and the rear foot unit 15 to allow the control of the levelling device 21 of the right or left rear foot unit 15.

With respect to the arrangement of the tilted actuation rod 36 described above, said arrangement is allowed by the space equal to or greater than 18 mm between the bottom and the floor. And this space also allows there to be superimposed maneuvering points for the front and rear joining device.

Furthermore, this arrangement and space allow the use of pins of connection groups 38 of an equal length for front foot units 14 and the rear foot unit 15.

FIG. 21 shows how a front foot unit 14 and a rear foot unit 15 provided with a joining device and levelling device are inserted in the respective holes 22 formed below the bottom 12.

FIG. 22 shows how two actuation rods 36 are arranged, once the front foot units 14 and rear foot units 15, complete with a joining device and levelling device, have been thus positioned.

More specifically, the correct assembly sequence is as follows:
- the rear foot unit 15 is fixed to the bottom 12;
- the rod 36 provided with grub screw 34 is screwed into the joining device;
- the front foot unit 14 is fixed to the bottom 12;
- the other transmission rod 36 is inserted until it connects with the rear leveller;
- a blocking clip 53 is applied for said last transmission rod 26.

An operative connection is thus obtained with the pinion 47 of the joining device and levelling device of the rear foot unit 15 (FIG. 20).

The subsequent FIG. 23 shows how to insert said blocking clip 53 in a housing 54 of the body 16 to cause the blockage in this operative position of the actuation rods 36.

Finally, FIG. 24 shows the final step in which the shoulder 11 is assembled on the bottom 12.

For this purpose, the pins 38, protruding from the shoulder 11, are inserted in the holes 37 of the body 16 of the front foot unit 14 and rear foot unit 15.

At the same time, the protruding appendix or nose 17 of the body 16 of the front foot unit 14 and of the rear foot unit 15 is inserted in the complementary slot-shaped recess 18 formed in the shoulder 11.

Figure 2A:
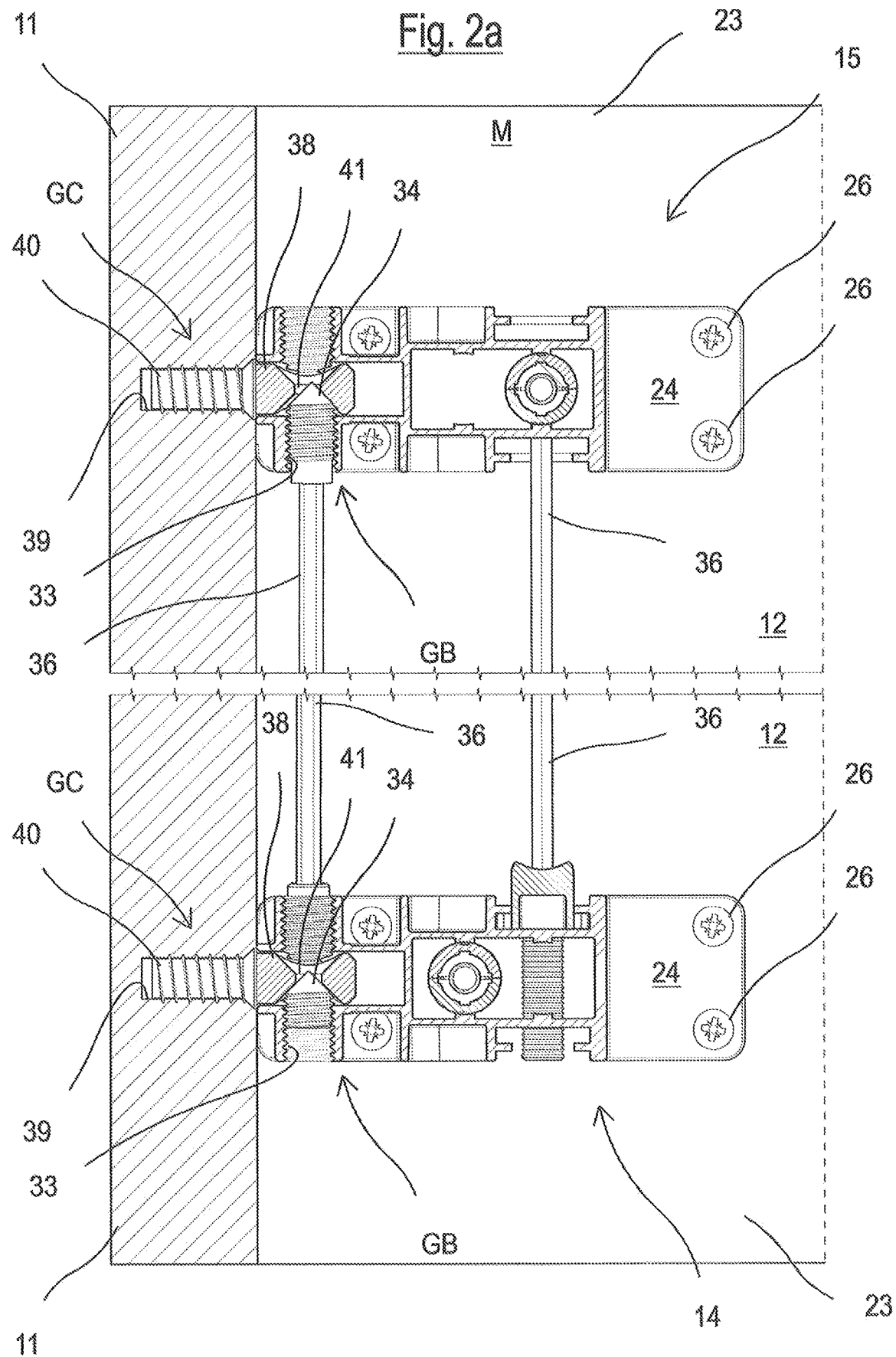
FIG. 2a is a partially sectional view from below of the joining and levelling system shown in FIG. 1, in correspondence with connection pins.

The blockage between the parts takes place, as shown in FIG. 2a, due to the fact that the grub screw 34 is inserted in the housing 41 of the pin 38.

FIGS. 25 to 33 show a simplified form of the system according to the invention.

In this example, in fact, there is the provision that there be only one joining device for parts of furniture and furnishing items.

The same elements are indicated with the same reference numbers and for similar elements the number "1" is added in front.

In any case, also in this example, the minimum number of components is provided, as only one body 116 is used for both the front foot unit 114 and the rear foot unit 115 which contains the sole joining device comprising a connection group GC associated with a blocking group GB.

The body 116 therefore has an extremely reduced size with an enlarged base 124, provided in the example with only two holes 125, which is arranged on the lower surface 23 of the bottom 12. Screws 126 are positioned in said holes 125 of the enlarged base 124 of the body 116 firmly constraining it below the bottom 12.

Also in this case, the body 116 provides a protruding appendix or nose 117 towards the right or left shoulder 11. This protruding appendix or nose 117 is suitable for being inserted in a complementary slot-shaped recess formed in the shoulder 11. Said protruding appendix or nose 117 also has an undercut 119 which is abutted against the short side of the bottom 12 facing the shoulder 11. Furthermore, also in this case, a pair of pegs 120 projecting above the body 116, is provided. Said pegs 120 are inserted in blind holes formed on a lower surface 23 facing downwards towards the bottom 12.

The body 116 provides pass-through holes 131, 132 superimposed in a direction vertical to the floor P.

The first pass-through holes 132 are also internally threaded in 133 to receive a grub screw 134 and form the blocking group GB, for both the front foot unit 114 and rear foot unit 115. Said holes 131 can have a collar 135 towards the outside which facilitates both the housing of the grub screw 134 and the housing of one end of an actuation rod 136 which controls it in rotation.

The second holes 131 are only pass-through holes for allowing the passage of an actuation rod 136.

In this second example, there is also the provision that the actuation rod 136 be arranged tilted between the front foot unit 114 and the rear foot unit 115.

Also in this simplified example, there are the same advantages previously indicated for the first example of the system of the invention.

The functioning of the joining and/or levelling system for parts of furniture and furnishing items previously described can be easily understood from what has just been indicated and shown in the accompanying drawings.

A joining and/or levelling system of this type for parts of furniture and furnishing items according to the invention enables there to be no visible holes, also allowing both the shoulders and the bottom to be detached from the floor.

In spite of this, once it has been correctly prepared, it allows an easy connection and levelling of furniture.

It is fixed to the bottom of the furniture and allows its front actuation with respect to the furniture through the space between the bottom or shoulder and the floor even when the space between the bottom and shoulder and floor is extremely limited, also in the order of 18 mm.

It should also be noted that a system of this type according to the invention contains both the connection group GC and the blocking group GB and also the levelling group 21.

Any actuation drawback is eliminated as it is possible to act both in connection and above all in levelling from the front part of the furniture without there being any visible hole in the furniture itself.

FIG. 1 shows how, by acting with a tool (not shown), passing inside the collar 35 and into the pass-through hole 31 threaded internally in 33, the grub screw 34 is caused to become engaged in the seat 41 of the pin 38 causing the connection between the shoulder 11 and bottom 12 thanks to the presence of the connection group GC.

To also implement the engagement of the connection unit GC of the rear foot unit 15, the same tool operates on the head of the transmission rod 36. Said head of the transmission rod 36 is housed in the pass-through hole 31 of the body 16 of the front foot unit 14. The opposite end of the transmission rod 36 thus acts on the grub screw 34 of the blocking group GB of the rear foot unit 15. This action causes the engagement of the grub screw 34 in the seat 41 of the pin 38, obtaining the connection between the shoulder 11 and the bottom 12 thanks to the presence of the connection group GC also in the rear-foot unit 15.

A similar operation is also effected for the levelling.

Again from FIG. 1 for example, it can be seen how, by acting with a tool (not shown), passing from the opening 42 of the body 16, on the pinion 47 of the levelling device 21 of the front foot unit 14, part of the correct levelling is effected. This takes place thanks to the movement of the hollow pusher element 52 towards the floor P to effect the levelling adjustment.

This levelling operation is completed by acting with a tool on the head of the relative transmission rod 36. Said head of the transmission rod 36 is housed in the opening 42 of the body 16 of the front foot unit 14. The opposite end of the actuation rod 36 thus acts on the pinion 47 of the levelling device 21 of the rear foot unit 15. This action identically causes the movement of the hollow pusher element 52 with respect to the floor. The raising or lowering of the bottom allows the adjustment of the leveller also present in the rear foot unit 15.

This should also be repeated identically with respect to the simplified example of FIGS. 25 to 33 in which the previous functioning considerations only relate to the joining device i.e. the connection group GC and the blocking group GB.

In this way, a stable and final blockage is obtained between the shoulder 11 and the bottom 12 of the furniture and in addition also the correct level positioning.

In view of the various embodiments previously illustrated and described, the characteristics of the system of the present invention are therefore repeated.

A joining and levelling system of this type for parts of furniture and furnishing items allows there to be no visible hole, once it has been correctly assembled for connecting and levelling the furniture, thus giving the furniture a high functional and aesthetic characteristic.

This type of system makes it possible to have front and rear foot units capable of supporting the whole piece of furniture and its contents in the presence of a minimum encumbrance between shoulder and bottom with respect to the floor.

Furthermore, even in the presence of a minimum encumbrance, even around 18 mm, it is possible to effect both the connection and blockage between the parts of the furniture (shoulder and bottom) together with adjustment of the level, when provided.

This is all achieved with a front actuation with respect to the furniture through the minimum space between the bottom and shoulder and the floor, in an extremely limited space between the bottom, shoulder and floor and generally considered by an operator as being very restricted.

Advantageously, with the system of the present invention, both the connection or joining group with relative blocking and also the levelling group beneath the thickness of the bottom and shoulder of the furniture are particularly compact and easy to actuate on the part of any operator.

Any actuation drawback is eliminated as it is possible to act both in connection and above all in levelling from the front part of the furniture without any visible hole in the furniture itself.

This provision also allows the elimination of any further element that serves for guaranteeing the correct direction or orientation of the screwdriver that must be present in the known additional systems in the form of a guide or similar item fixed to the bottom of the furniture.

Furthermore, according to the invention, the body of the front and rear foot units is advantageously unified and can be easily positioned both on the right and on the left, both at the front and at the back.

The objectives mentioned in the preamble of the description have thus been achieved.

The protection scope of the present invention is defined by the enclosed claims.

The invention claimed is:

1. A joining and levelling system adapted for use in furniture and furnishing items with a bottom and a shoulder positionable with respect to a floor comprising, in combination:

a front foot unit; and a rear foot unit, wherein the front foot unit comprise a first connection group that includes a first pin having a first cavity at an end thereof, and a first blocking group that includes a first grub screw that engages the first cavity, wherein the rear foot unit comprise a second connection group that includes a second pin having a second cavity at an end thereof, and a second blocking group that includes a second grub screw that engages the second cavity, the first and the second connection groups and blocking groups being arranged for stably interconnecting said bottom and said shoulder, wherein said front foot unit and said rear foot unit are positioned beneath said bottom to face said shoulder, wherein said bottom and said shoulder do not rest on the floor, and wherein said front foot unit and said rear foot unit have identical bodies (16, 116), each of said identical bodies having a first opening on a side disposed to face said shoulder and a second and a third opening on a side disposed to be perpendicular to said shoulder; and an actuation rod extending between the front foot unit and the rear foot unit, wherein, in the front foot unit, the first opening receives the first pin, the second opening receives the actuation rod, which extends through the front foot unit, and the third opening receives the first grub screw for engaging the first pin, wherein, in the rear foot unit, the first opening receives the second pin, and the third opening receives the second grub screw for engaging the second pin, the actuation rod extending angularly in relation to the floor from the second opening in the front foot unit to the second grub screw in the third opening in the rear foot unit, and wherein the second grub screw is actuated by actuating the actuation rod at the front foot unit.

2. The joining and levelling system according to claim 1, wherein each of the front foot unit and the rear foot unit further comprises a levelling device with a height adjustment mechanism configured to be maneuvered with a tool, and wherein said levelling device of said front and said rear foot units can be actuated from the front with respect to the furniture.

3. The joining and levelling system according to claim 2, wherein each of said identical bodies comprises two adjacent housings, a first one of said two adjacent housings receiving the first and respectively the second grub screw, and a second one of said two adjacent housings being configured to selectively house said levelling device to form said front foot unit and, respectively, said rear foot unit.

4. The joining and levelling system according to claim 1, wherein each of the identical bodies comprises a molded body in a zinc-base alloy, which provides voids and lightening and/or stiffening ribs.

5. The joining and levelling system according to claim 1, wherein each of said identical bodies is configured to be associated beneath the bottom and face said shoulder, and provides, from on the side disposed to face said shoulder, a protruding appendix or nose which is configured to be inserted in a complementary slot-shaped recess formed in the shoulder.

6. The joining and levelling system according to claim 5, wherein said protruding appendix or nose has an undercut that is abutted against a side of the bottom facing the shoulder.

7. The joining and levelling system according to claim 1, wherein each of said identical bodies comprises, in a surface facing said bottom, a pair of upwardly protruding pegs, which are inserted in blind holes formed on a lower surface of said bottom, said blind holes facing downwards in relation to the bottom.

8. The joining and levelling system according to claim 2, wherein each of said identical bodies comprises a first portion with a smaller dimension that is adjacent to a second portion with a larger dimension, said second portion having two housings adjacent to each other, and being configured to selectively house said levelling device to form said front foot unit or, alternatively, said rear foot unit.

9. The joining and levelling system according to claim 2,
wherein said levelling device comprises a casing containing, in an interior thereof, a pinion-toothed crown bevel,
wherein a pinion of said pinion-toothed crown bevel is rotatingly positioned inside the casing and engages a toothed crown of said pinion-toothed crown bevel, said toothed crown being formed as a head of a threaded screw, said toothed crown being rotatable inside the casing without translating longitudinally,
wherein said threaded screw is positioned in a threaded hole inside a hollow pusher element, and is positioned coaxially with respect to an outside of the casing, and
wherein a rotation of the threaded screw causes an upward or downward movement of the hollow pusher element and an adjustment of the levelling device.

10. The joining and levelling system according to claim 1, wherein said first and respectively said second grub screw is disposed to be moved from an engagement position to a disengagement position with said first and respectively said second pin.

11. The joining and levelling system according to claim 1, wherein said first pin and said second pin are of equal length.

* * * * *